(12) United States Patent
Shamshoian (10) Patent No.: US 12,443,158 B2
(45) Date of Patent: Oct. 14, 2025

(54) MODULAR AIR HANDLING SYSTEMS (71) Applicant: Gary Peter Shamshoian, Cupertino, CA (US)

(72) Inventor: Gary Peter Shamshoian, Cupertino, CA (US)

( * ) Notice: Subject to any disclaimer, the term of this patent is extended or adjusted under 35 U.S.C. 154(b) by 493 days.

(21) Appl. No.: 18/102,045

(22) Filed: Jan. 26, 2023

(65) Prior Publication Data

US 2023/0176536 A1    Jun. 8, 2023

Related U.S. Application Data

(63) Continuation-in-part of application No. 16/984,147, filed on Aug. 3, 2020, now abandoned.

(51) Int. Cl.
*G05B 19/042*    (2006.01)

(52) U.S. Cl.
CPC .... *G05B 19/042* (2013.01); *G05B 2219/2614* (2013.01)

(58) Field of Classification Search
CPC .... F24F 3/16; F24F 13/10; F24F 13/24; F24F 13/28; F24F 2013/242; F24F 2221/36; G05B 19/042; G05B 2219/2614
USPC ........................................................ 454/370
See application file for complete search history.

(56) References Cited

U.S. PATENT DOCUMENTS

| | | | | |
|---|---|---|---|---|
| 5,396,782 A | * | 3/1995 | Ley | F24F 13/32 |
| | | | | 62/297 |
| 6,126,540 A | * | 10/2000 | Janu | F24F 11/74 |
| | | | | 454/236 |
| 11,506,408 B2 | * | 11/2022 | Uhlik | F24F 11/56 |
| 2008/0311840 A1 | * | 12/2008 | Rainey | F24F 13/24 |
| | | | | 454/251 |
| 2015/0111487 A1 | * | 4/2015 | Son | F24F 3/044 |
| | | | | 454/329 |
| 2022/0243951 A1 | * | 8/2022 | Phillips | F24F 1/00075 |

* cited by examiner

*Primary Examiner* — Avinash A Savani
*Assistant Examiner* — Dana K Tighe
(74) *Attorney, Agent, or Firm* — KALI LAW GROUP, P.C.

(57) ABSTRACT

Modular air handling systems are presented including: at least one blade, where the at least one blade includes: an intake section for receiving an airflow including: an intake air portion, a filter portion, a coil portion, and a head portion; a removable fan module, where the removable fan module includes: at least one low velocity axial fan; and an isolation damper; a discharge section for discharging the airflow including: a discharge air portion; and a number of sensors for receiving process data, discharge data, and environmental data; and a control system for processing data from the number of sensors to provide a closed loop control of the modular air handling system, where each blade operates independently, and where the at least one low velocity axial fan for each removable fan module are controlled by a single control signal.

19 Claims, 9 Drawing Sheets

MODULAR AIR HANDLING SYSTEMS

FIELD OF INVENTION

The invention described herein relates to air moving fan units and, more particularly, to modular air handling systems that feature improved efficiency, flexibility, redundancy, reliability, and resilience.

BACKGROUND

Figure 1:
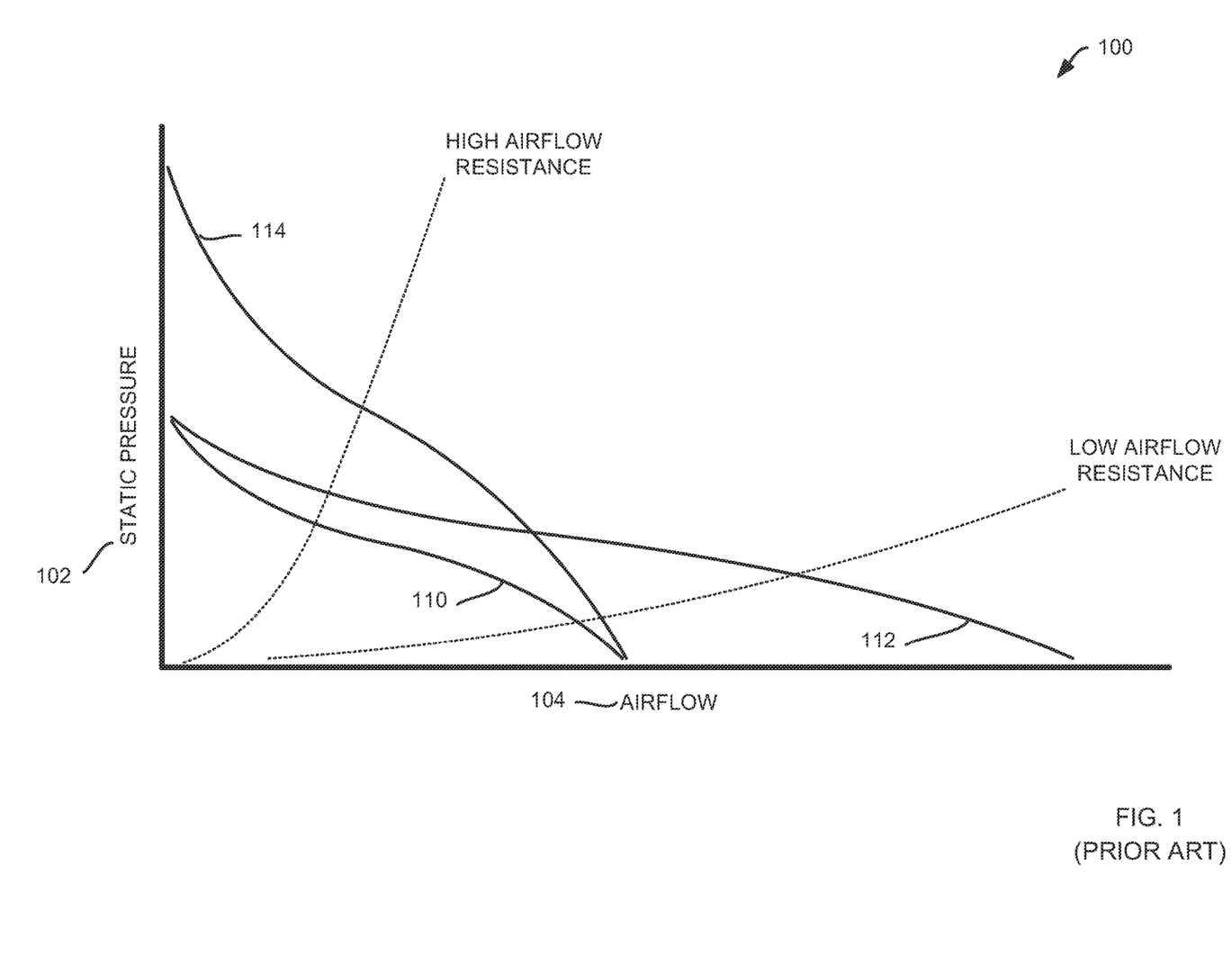
FIG. 1 is a prior art representation of fan operations.

In general, larger, or faster fans will provide greater maximum airflow and greater maximum pressure, while the same fan at a slower speed operates quieter and more efficiently. With proper aerodynamic design, two fans need less overall energy than a single fan moving the same airflow. If a single fan is unable to deliver the required airflow or pressure, then two or more fans can be operated physically in parallel or in series. In FIG. 1, which is a prior art graphical representation 100 of fan operations, static pressure 102 is graphed against airflow 104 for a single fan 110, fans operating in parallel 112, and fans in series 114. As illustrated, operating fans in parallel (112) will increase the maximum available airflow, but will not increase the maximum pressure, whereas operating fans in series (114) will increase the maximum available pressure but will not increase the maximum available airflow. The performance curve for operating multiple fans in series can be generated in a similar manner, with the pressure values altered by the number of fans in series. Ultimately, multiple fans in parallel provide the greatest improvement for high airflow and low-pressure systems, while multiple fans in series provide the greatest improvement for high pressure and low airflow systems.

Figure 2:
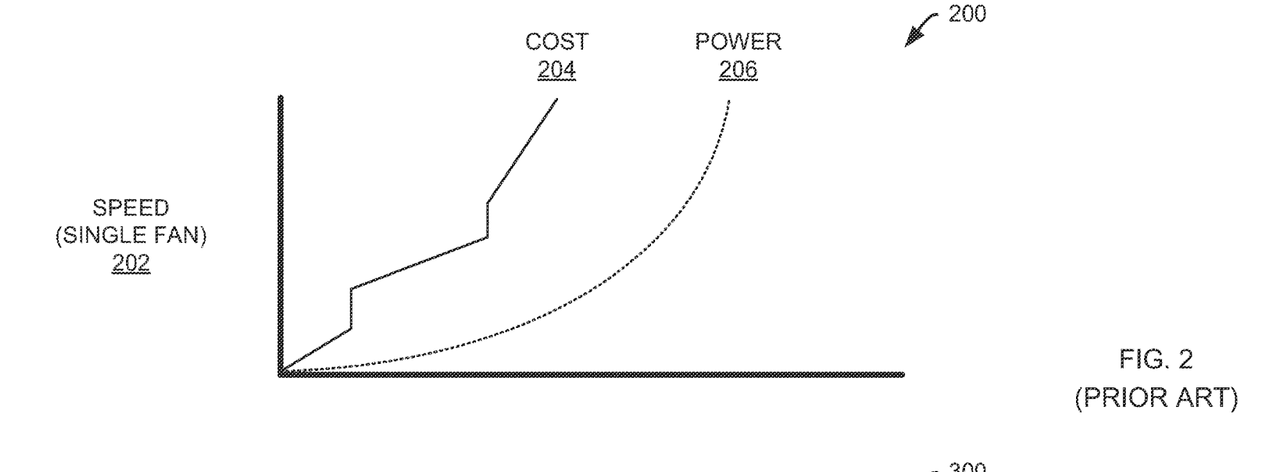
FIG. 2 is a prior art graphical representation of a single fan's speed vs cost and power.
Figure 3:
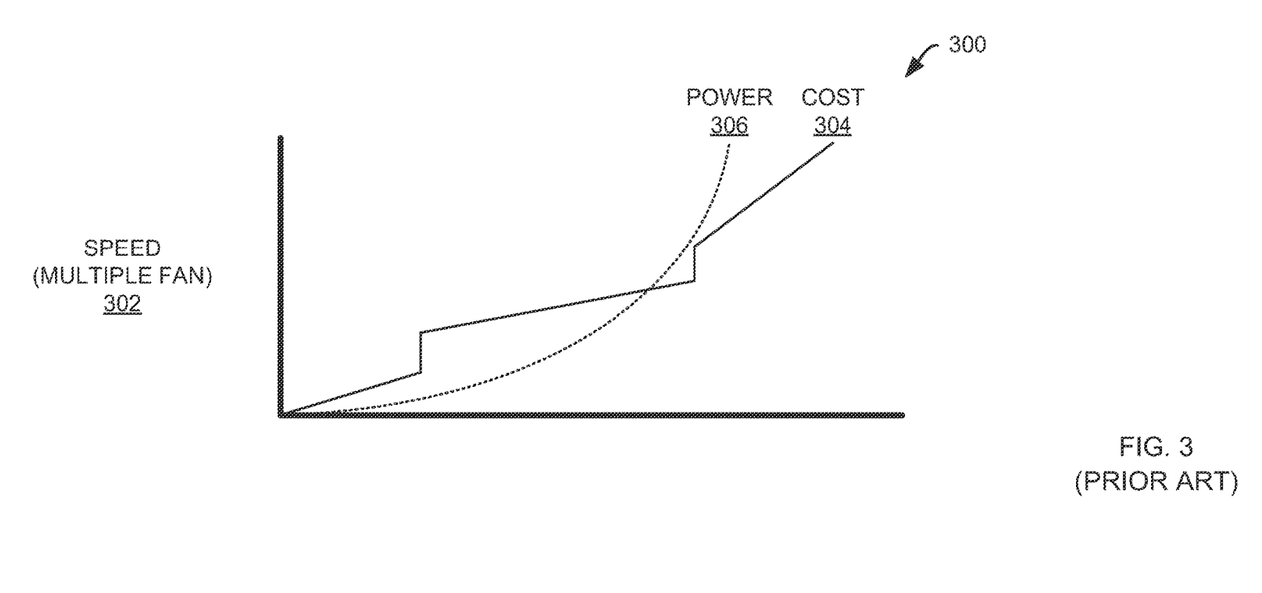
FIG. 3 is a prior art graphical representation of multiple fans' speed vs cost and power.

One design consideration for determining whether to utilize single or multiple fan configurations are costs. FIG. 2 is a prior art graphical representation 200 of a single fan's speed 202 vs cost 204 and power 206. The power required to operate a fan increases by the cube of the speed of the fan, which in turn increases cost. Likewise, in FIG. 3, a prior art graphical representation 300 of multiple fans' speed 302 vs cost 304 and power 306. Thus, simply increasing fan speed to meet airflow demand in conventional systems carries a commensurate increase in costs.

Figure 4:
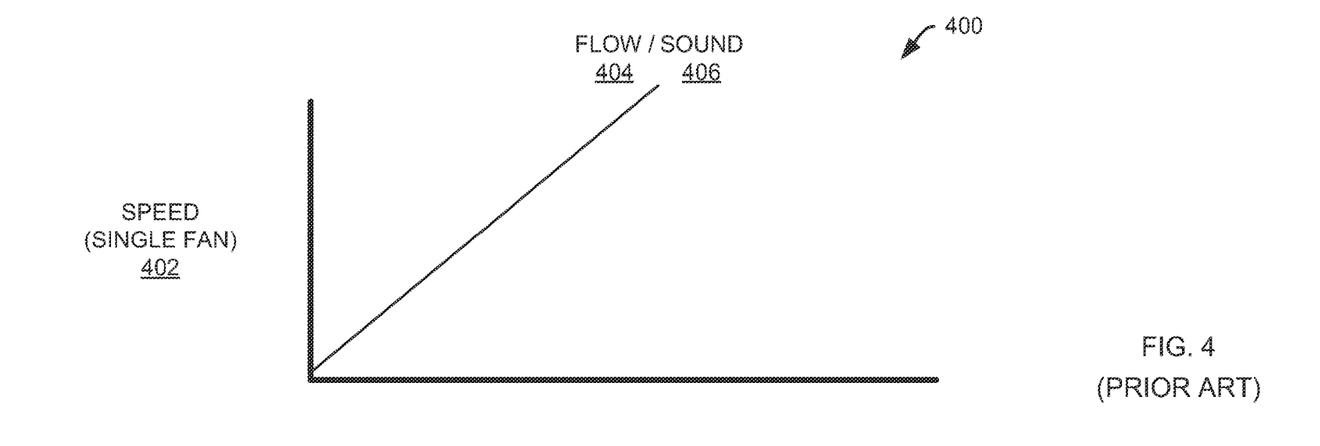
FIG. 4 is a prior art graphical representation of a single fan's speed vs flow and sound.
Figure 5:
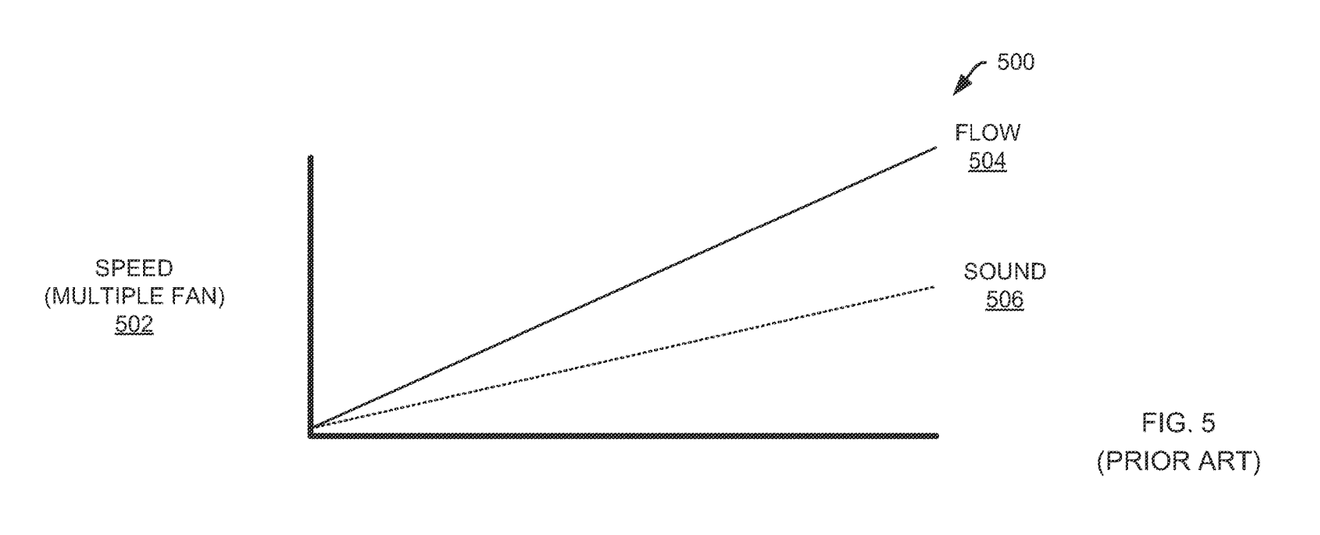
FIG. 5 is a prior art graphical representation of multiple fans' speed vs flow and sound.

Yet another design consideration for determining whether to utilize single or multiple fan configurations is acoustic noise. FIG. 4 is a prior art graphical representation 400 of a single fan's speed 402 vs flow 404 and sound 406. The acoustic noise produced by a fan will increase as the speed of the fan is increased, however multiple fans moving the same air will generate lower overall sound power levels. Likewise, in FIG. 5, a prior art graphical representation 500 of multiple fans' speed 502 vs flow 504 and sound 506. Thus, simply increasing fan speed to meet airflow demand in conventional systems carries a commensurate increase in acoustic noise.

Thus, it may be desirable to provide solutions that offer a combination of in-series and parallel configurations to accommodate varying airflow demands; to provide solutions that do not require significant increases in power consumption to accommodate varying airflow demand; and to provide solutions that do not require significant increases in acoustic noise to accommodate varying airflow demand. As such, modular air handling systems are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, modular air handling systems are presented including: at least one blade, where the at least one blade includes: an intake section for receiving an airflow including: an intake air portion, a filter portion, a coil portion, and a head portion; a removable fan module, where the removable fan module includes: at least one low velocity axial fan; and an isolation damper; a discharge section for discharging the airflow including: a discharge air portion; and a number of sensors for receiving process data, discharge data, and environmental data; and a control system for processing data from the number of sensors to provide a closed loop control of the modular air handling system, where each blade operates independently, and where the at least one low velocity axial fan for each removable fan module are controlled by a single control signal. In some embodiments, the head portion further includes: a number of inlet airflow guides for providing acoustic attenuation and flow straightening; a transition portion for redirecting the airflow; and a number of outlet airflow guides for providing acoustic attenuation and flow straightening. In some embodiments, the head portion further includes: an access section having an access door. In some embodiments, the head portion is manufactured from an acoustical energy absorbing material such as: a polymeric material, a polyvinylidene fluoride material, a polyamide material, a polyethylene terephthalate material, a fiberglass material, a perforated metal liner, and a mineral wool material. In some embodiments, the intake section further includes a first humidifier. In some embodiments, the intake section is configured to receive any of outside air, return air, or both outside and return air. In some embodiments, the filter portion further includes: a filter selected from the group consisting of: a high efficiency particulate air (HEPA) filter and an ultra-low penetration air (ULPA) filter. In some embodiments, the low velocity fan further includes: a forward nosecone; and an aft nosecone. In some embodiments, the discharge section further includes a second humidifier. In some embodiments, the number of sensors for receiving process data include: a number of coil temperature differential sensors; a number of pressure sensors; a filter pressure drop sensor; an airflow sensor; and a motor current sensor. In some embodiments, the number of sensors for receiving discharge data include: a discharge temperature sensor; a discharge humidity sensor; a discharge smoke sensor; a discharge airflow sensor; and a discharge pressure sensor. In some embodiments, the number of sensors for receiving environmental data include: an ambient air temperature sensor; an ambient humidity sensor; a room humidity sensor; and a corresponding room temperature sensor.

In other embodiments, modular air handling systems are presented including: at least one blade, where each of the at least one blades includes: an intake section for receiving an airflow including: an intake air portion, a filter portion, a coil portion, and a head portion; a removable fan module, where the removable fan module includes: at least two low velocity axial fans; and an isolation damper; a discharge section for discharging the airflow including: a discharge air portion; and a number of sensors for receiving process data, discharge data, and environmental data; and a control system for processing data from the number of sensors to provide a closed loop control of the modular air handling system, where each blade operates independently, and where the at least two low velocity axial fans for each removable fan module are controlled by a single control signal. In some embodiments, the at least two fans are positioned in series or in parallel with respect to one another within each removable fan module.

In other embodiments, modular air handling systems are presented including: at least two blades, where each of the at least two blades includes: an intake section for receiving an airflow including: an intake air portion, a filter portion, a coil portion, and a head portion; a removable fan module, where the removable fan module includes: a number of low velocity axial fans; and an isolation damper; a discharge section for discharging the airflow including: a discharge air portion; and a number of sensors for receiving process data, discharge data, and environmental data; and a control system for processing data from the number of sensors to provide a closed loop control of the modular air handling system, where each blade operates independently, and where the number of low velocity axial fans for each removable fan module are controlled by a single control signal. In some embodiments, the at least two fans are positioned in series or in parallel with respect to one another within each removable fan module.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 6:
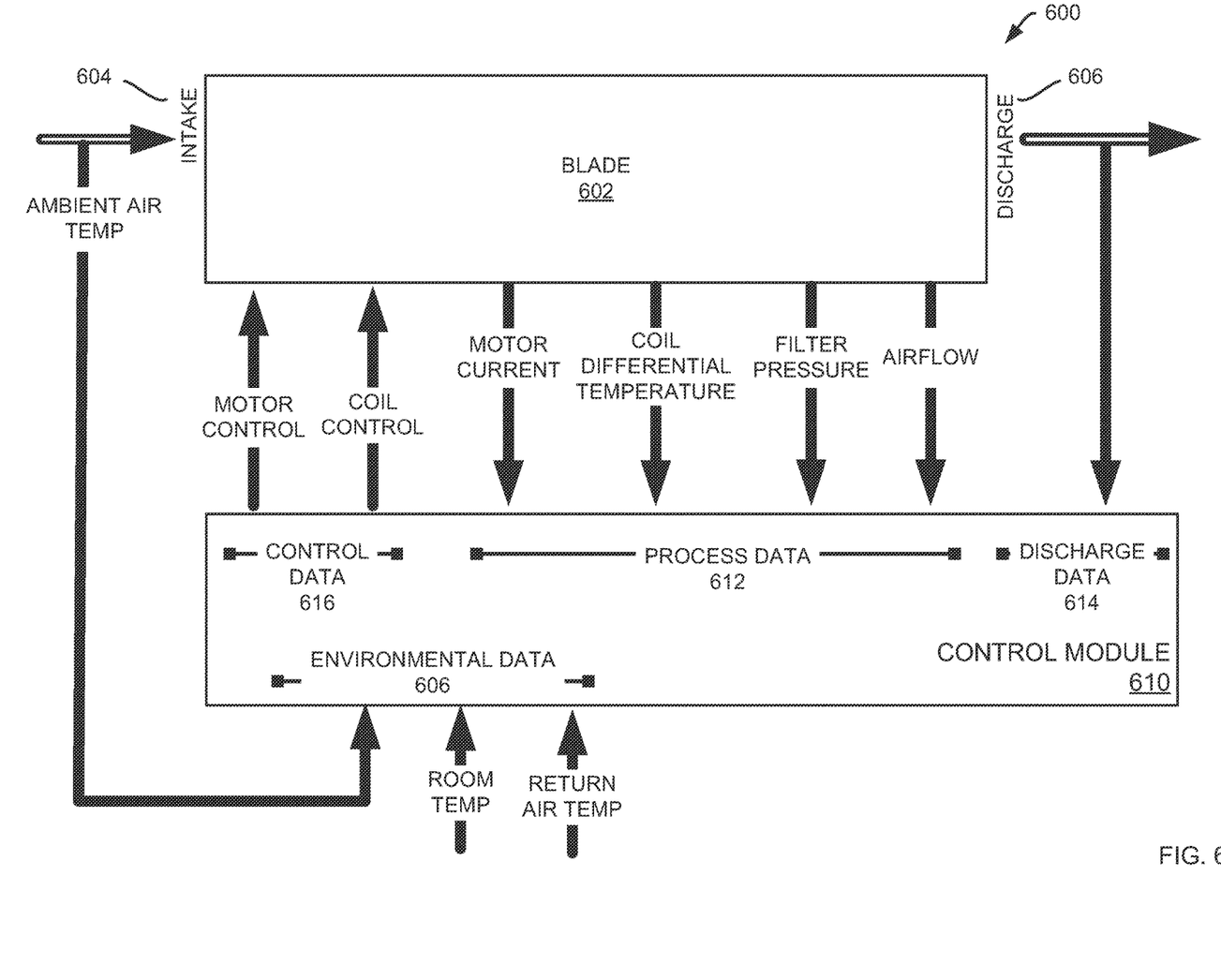
FIG. 6 is an illustrative representation of a modular air handling system architecture in accordance with embodiments of the present invention.

FIG. 6 is an illustrative representation of a modular air handling system architecture 600 in accordance with embodiments of the present invention. In its simplest form, embodiments provided herein intake air, process the air, and discharge the air. As illustrated, an air handling module or "blade" 602 receives air at intake 604 and discharges air at exhaust 606. In embodiments, intake air may include: outside air, return air, or both outside and return air without limitation. In order to provide methods of effectively and efficiently controlling air handling processes, several types of data may be received and transmitted by control module 610 via various corresponding sensors. Input data include process data 612, discharge data 614, and environmental data 616. In embodiments, process data include at least fan motor current data, cooling and/or heating coil differential temperature data, filter pressure data, and airflow data of in-process airflow. Further in embodiments, discharge data include at least discharge airflow data, discharge temperature data, discharge pressure data, and discharge relative humidity data of discharged airflow. Still further in embodiments, environmental data include at least ambient air temperature data, ambient air humidity data, return air temperature data, and room and/or zone temperature data. When these data received are processed, output data may be transmitted in response respond to various changes in the system. Output data is control data 616 that includes motor control data and coil control valve data which serve to determine fan speed and coil differential temperature respectively. In embodiments coil differential temperature corresponds with temperature and relative humidity control. Importantly, embodiments disclosed herein contemplate a control system where each blade in the system is controlled independently, often with the same control signals to each blade, to address airflow requirements in a building. Control system embodiments, as contemplated herein may be located on-board with the blade or separately located from the blade without limitation. Because each blade is independently controlled, any individual blade may be removed or isolated without interruption in service.

Figure 7:
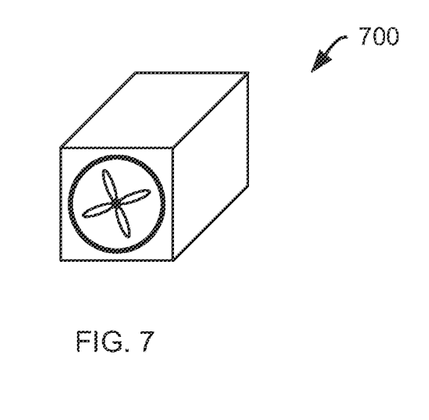
FIG. 7 is illustrative representation of a fan module configuration in a modular air handling system in accordance with embodiments of the present invention.
Figure 8:
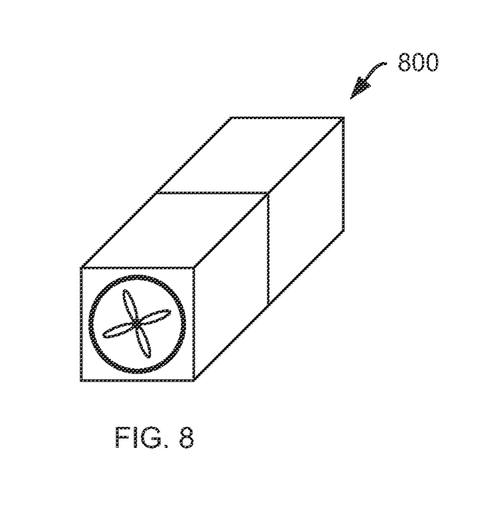
FIG. 8 is an illustrative representation of a fan module configuration in a modular air handling system in accordance with embodiments of the present invention.
Figure 9:
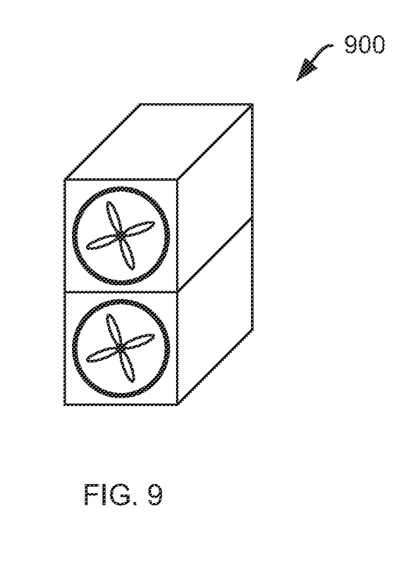
FIG. 9 is an illustrative representation of a fan module configuration in a modular air handling system in accordance with embodiments of the present invention.
Figure 10:
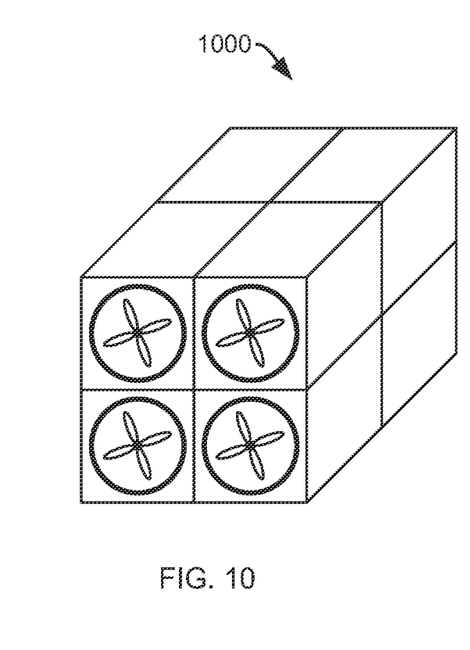
FIG. 10 is an illustrative representation of a fan module configuration in a modular air handling system in accordance with embodiments of the present invention.

FIGS. 7-10 are illustrative representations of various fan module configurations in a modular air handling system in accordance with embodiments of the present invention. In particular, FIG. 7 illustrates a single fan in a single fan module 700 in an embodiment. FIG. 8 illustrates two fans in series in a single fan module 800 in an embodiment. Similarly, FIG. 9 illustrates two fans stacked in parallel in a single fan module 900 in an embodiment. Further, FIG. 10 illustrates four fans in a grid that are in series and in parallel in a single fan module 1000 in an embodiment. In embodiments, each blade includes a single fan module that may include multiple fans. These multiple fans may be configured singularly or multiply in series, in parallel, or both in series and in parallel without limitation. Importantly, all the fans in a fan module are controlled by the same signal. That is, control granularity is addressed at the fan module level. In this manner, control is simplified as separate signals for each fan in a fan module is not required. The foregoing configuration embodiments demonstrate at least some of the flexibility of modular systems disclosed herein and should not be construed as limiting.

Figure 11:
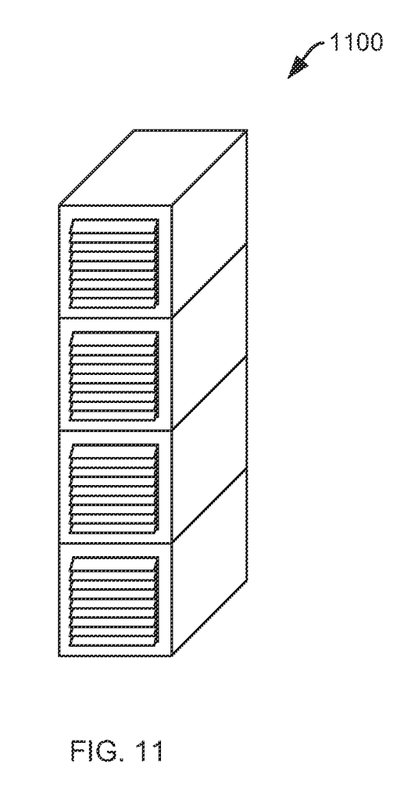
FIG. 11 is an illustrative representation of a blade configuration in a modular air handling system in accordance with embodiments of the present invention.
Figure 12:
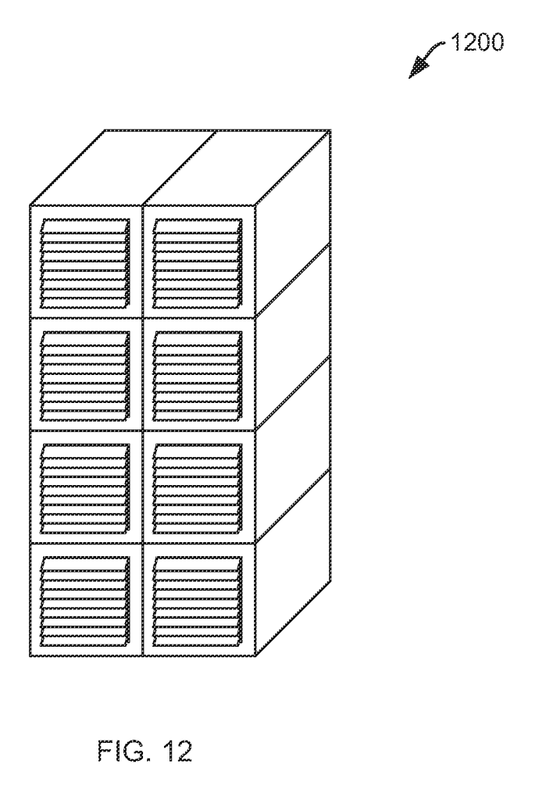
FIG. 12 is an illustrative representation of a blade configuration in a modular air handling system in accordance with embodiments of the present invention.

FIGS. 11-12 are illustrative representations of various blade configurations in a modular air handling system in accordance with embodiments of the present invention. In particular, FIG. 11 illustrates a stack 1100 of four blades in an embodiment. In addition, FIG. 12 illustrates a grid 1200 of eight blades in an embodiment. Notably, blade configurations may be configured singularly or multiply in parallel in a stack or grid without limitation. The foregoing configuration embodiments demonstrate at least some of the flexibility of modular systems disclosed herein and should not be construed as limiting.

Figure 13:
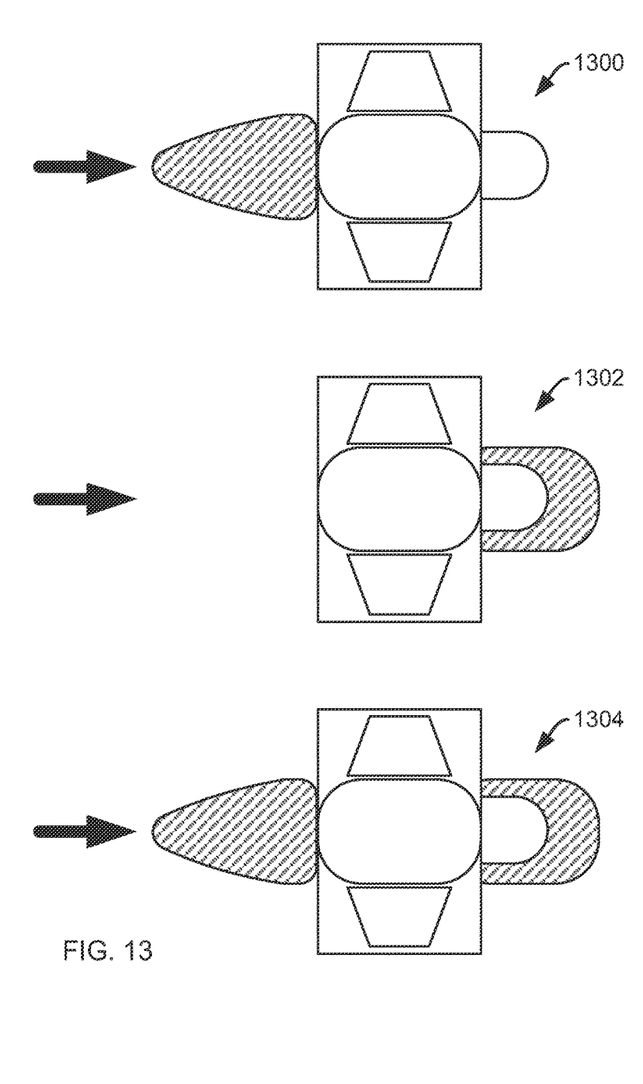
FIG. 13 is an illustrative representation of a removable fan module nose cone configuration in accordance with embodiments of the present invention.
Figure 14:
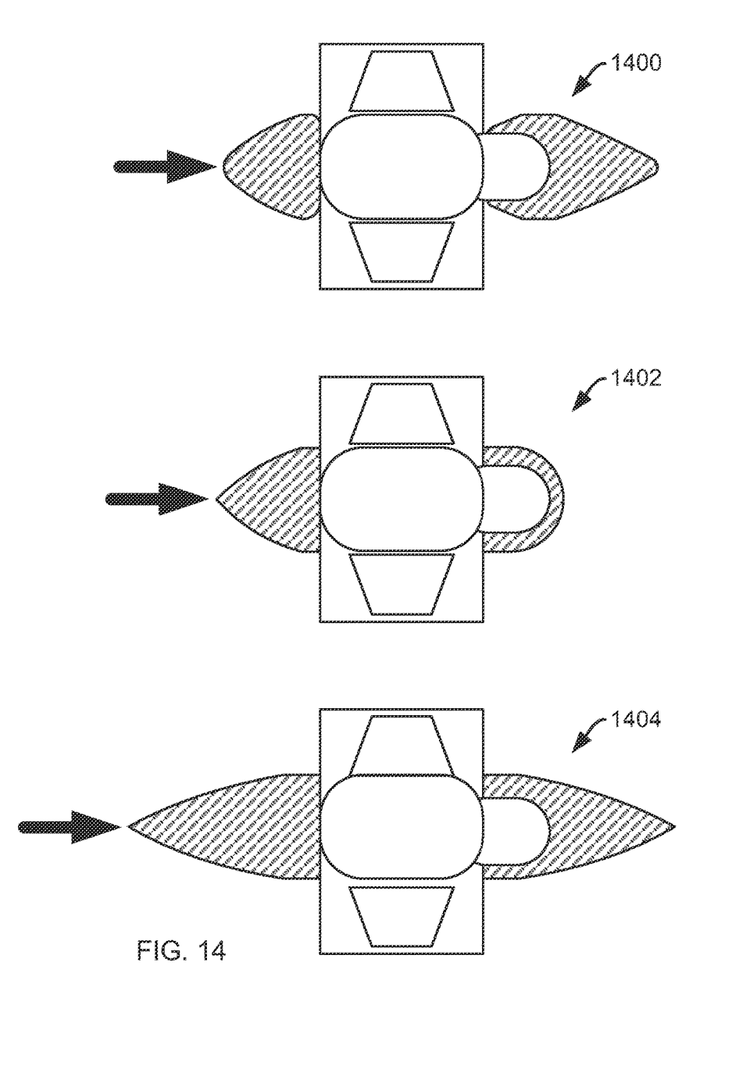
FIG. 14 is an illustrative representation of a removable fan module nose cone configuration in accordance with embodiments of the present invention.

FIGS. 13-14 are illustrative representations of a removable fan module nosecone configurations in accordance with embodiments of the present invention. In embodiments, various shapes of nosecones may be utilized to accommodate specific types of axial fan motors. Selection of a particular nosecone may reduce acoustical noise, save space, and affect overall length of the removable fan module. As illustrated in FIG. 13, a forward nosecone configuration 1300, an aft nosecone configuration 1302, and a forward and aft nosecone configuration 1304 may be utilized without limitation. As illustrated in FIG. 14, a short taper forward nosecone and long taper aft nosecone configuration 1400, a short taper forward nosecone and rounded aft nosecone configuration 1402, a long taper forward nosecone and long taper aft nosecone configuration 1404 may be utilized without limitation. Furthermore, tapered embodiments may include round to square and square to round tapers without limitation. The foregoing nosecone embodiments demonstrate at least some of the flexibility of modular systems disclosed herein and should not be construed as limiting.

Figure 15:
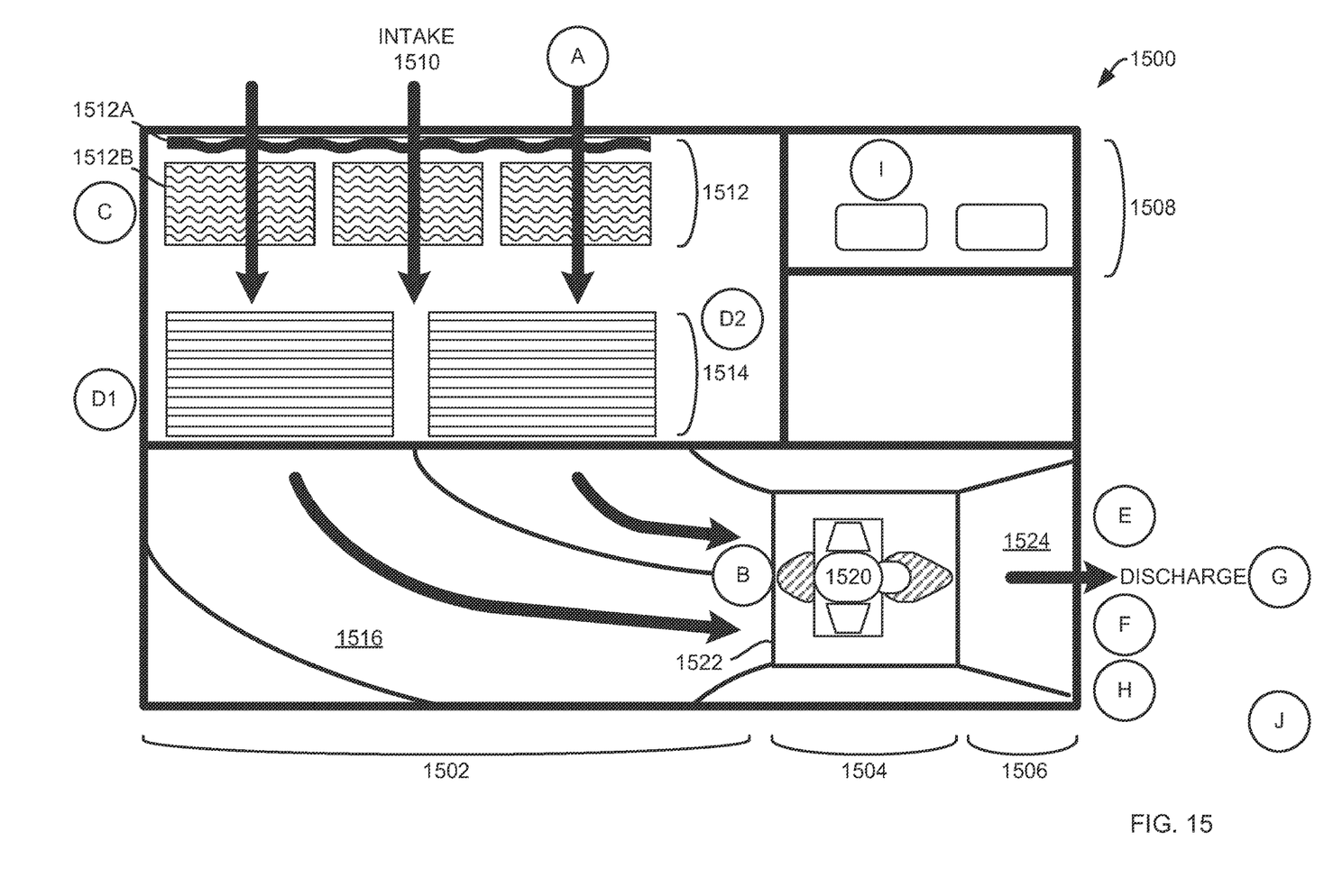
FIG. 15 is illustrative representation of a modular air handling system configuration in accordance with embodiments of the present invention.

FIG. 15 is illustrative representation of a modular air handling system configuration in accordance with embodiments of the present invention. In particular, FIG. 15 illustrates a single blade 1500 embodiment. In general, antimicrobial drain pans or entire interior finishes can be provided to minimize maintenance requirements for each blade. As illustrated, blade 1500 includes intake section 1502, removable fan module 1504, discharge section 1506, and control system 1508. Illustrated intake section 1502 includes intake air portion 1510, which may include a number of control dampers for controlling intake airflow. In addition, in embodiments, intake air portions may intake air from one or more sides depending on the particular configuration. Further illustrated, intake section 1502 includes filter portion 1512 that includes optional pre-filter 1512A and filter 1512B. In embodiments, filters may include a low pressure drop filter, a carbon filter, a high efficiency particulate air (HEPA) filter and an ultra-low penetration air (ULPA) filter. Further illustrated, intake section 1502 includes coil portion 1514 that may include, in embodiments, a cooling coil, a dual cooling coil, a heating coil, and, in other embodiments, a humidifier. Further illustrated, intake section 1502 includes head portion 1516 that includes a number of inlet airflow guides and outlet airflow guides for providing acoustic attenuation and flow straightening and a transition portion of redirecting the airflow. As contemplated herein, the head portion turns the airflow without turbulence to create a compact air handler unit, which allows for more flexible installation arrangements. The most common configuration of a head portion embodiment is a redirection of the airflow in a range of approximately 90 to 180 degrees thus incorporating an airflow acceleration, an acoustical dampening, and a flow straightening function. This head portion reroutes and accelerates the air, dampens acoustical energy, and can be configured with an optional access section and access door for maintenance purposes. The head portion allows a blade to have a smaller installation footprint. In some embodiments, the head portion is manufactured from an acoustical energy absorbing material such as: a polymeric material, a polyvinylidene fluoride material, a polyamide material, a polyethylene terephthalate material, a fiberglass material, a perforated metal liner, and a mineral wool material. As illustrated, removable fan module 1504 includes low velocity axial fan 1520 and isolation damper 1522. In embodiments, isolation dampers may be moved manually or automatically into place when needed to isolate the removable fan module when a repair or replacement is needed. As such, one blade may be serviced without interrupting other blades. Further illustrated discharge section 1506 includes discharge air portion 1524 and in some embodiments an optional humidifier (not shown). Further illustrated is control system 1508 for processing data from a variety of sensors to provide a closed lop control of the air handling management system such that each blade operates independently.

As noted above, a variety of sensors may be utilized for controlling air handling systems disclosed herein. As illustrated, at least the following sensors may be provided:

A—Ambient air temperature sensor and ambient air humidity sensor;
    B—Air flow sensor;
    C—Filter pressure drop sensor;
    D1 and D2—Coil temperature differential sensors;

E—Discharge temperature sensor;
F—Discharge humidity sensor;
G—Discharge pressure sensor;
H—Discharge smoke sensor;
I—Motor current and power sensor; and
J—Room or Zone temperature sensor.

In addition, a room humidity sensor and a discharge airflow sensor may be utilized in some embodiments.

Figure 16:
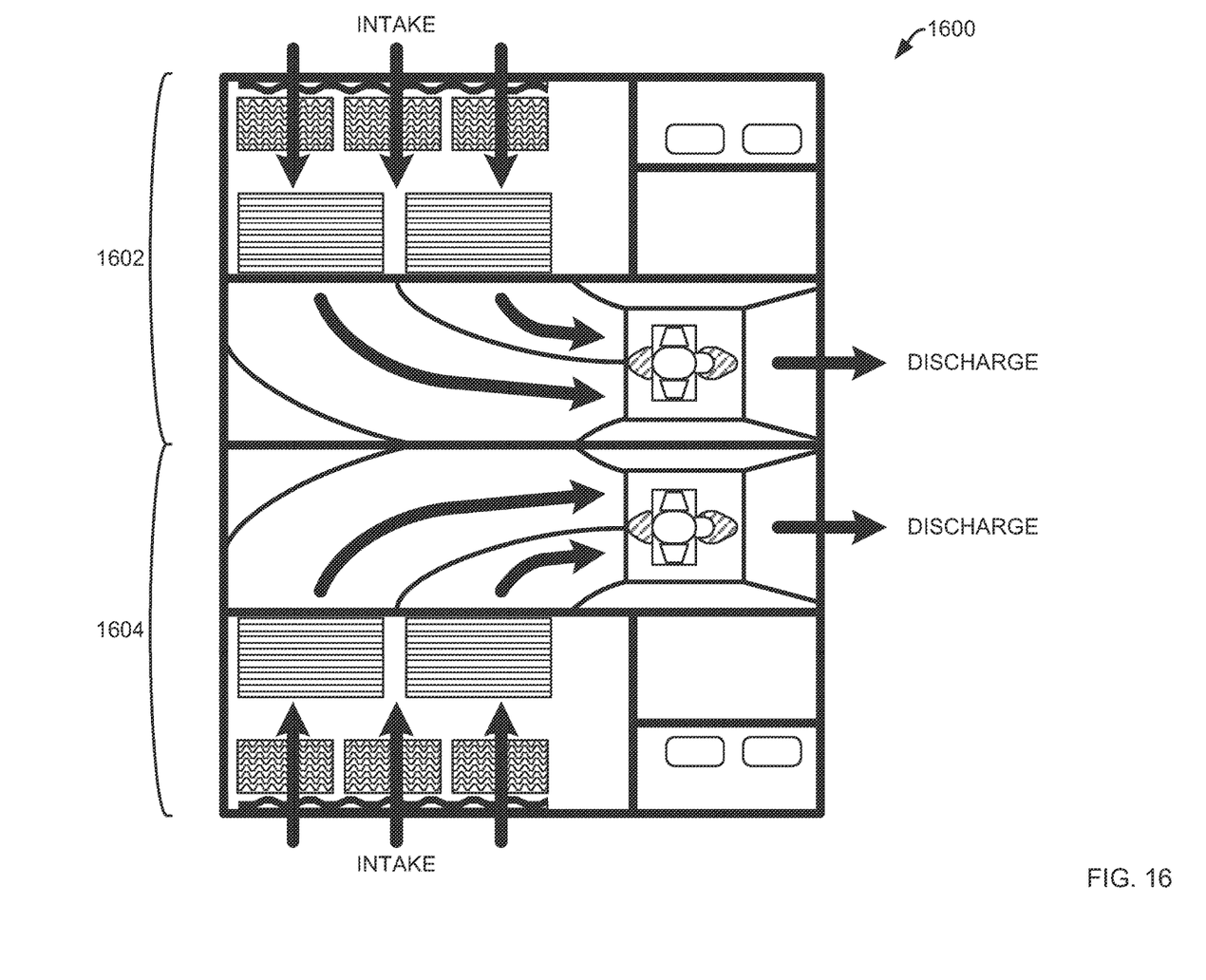
FIG. 16 is illustrative representation of a modular air handling system configuration in accordance with embodiments of the present invention.

FIG. 16 is illustrative representation of a modular air handling system configuration in accordance with embodiments of the present invention. In particular, FIG. 16 illustrates a two-blade 1600 embodiment with a first blade 1602 configured in parallel with a second blade 1604. In the illustrated embodiments, the blades are facing such that the intake is located on opposite sides and the discharge is located on the same side. The illustrated embodiment represents a single example and should not be construed as limiting as the blades may be positioned in any manner suitable for a particular installation and noted for FIGS. 7-12. As contemplated herein, each blade operates independently and is designed to stack upon or to be positioned next to one another to meet the desired total capacity requirements for the modular air handling system so if any component on one blade fails, the failed blade can be isolated automatically, and the other blades will increase in speed to meet the required capacity. For example, when a fan failure event occurs on an HVAC system, then the failed fan module can be manually or automatically isolated for repair or replacement while the modular air handling system continues to function.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A modular air handling system comprising:
   at least one blade, wherein the at least one blade comprises:
      an intake section for receiving an airflow comprising:
         an intake air portion, a filter portion, a coil portion, and a head portion;
      a removable fan module, wherein the removable fan module comprises:
         at least one low velocity axial fan; and an isolation damper;
      a discharge section for discharging the airflow comprising:
         a discharge air portion; and
         a plurality of sensors for receiving process data, discharge data, and environmental data; and
   a control system for processing data from the plurality of sensors to provide a closed loop control of the modular air handling system, wherein
      each blade operates independently, and wherein
      the at least one low velocity axial fan for each removable fan module are controlled by a single control signal.

2. The modular air handling system of claim 1, wherein the head portion further comprises:
   a plurality of inlet airflow guides for providing acoustic attenuation and flow straightening;
   a transition portion for redirecting the airflow; and
   a plurality of outlet airflow guides for providing acoustic attenuation and flow straightening.

3. The modular air handling system of claim 2, wherein the head portion further comprises:
   an access section having an access door.

4. The modular air handling system of claim 1, wherein the head portion is manufactured from an acoustical energy absorbing material selected from the group consisting of: a polymeric material, a polyvinylidene fluoride material, a polyamide material, a polyethylene terephthalate material, a fiberglass material, a perforated metal liner, and a mineral wool material.

5. The modular air handling system of claim 1, wherein the intake section further comprises a first humidifier.

6. The modular air handling system of claim 1, wherein the intake section is configured to receive any of outside air, return air, or both outside and return air.

7. The modular air handling system of claim 1, wherein the filter portion further comprises at least one low pressure drop filter.

8. The modular air handling system of claim 7, wherein the filter portion further comprises a filter selected from the group consisting of: a pre-filter, a final filter, and a carbon filter.

9. The modular air handling system of claim 1, wherein the coil portion is selected from the group consisting of: a cooling coil, a dual cooling coil, and a heating coil.

10. The modular air handling system of claim 1, wherein the filter portion further comprises: a filter selected from the group consisting of: a high efficiency particulate air (HEPA) filter and an ultra-low penetration air (ULPA) filter.

11. The modular air handling system of claim 1, wherein the low velocity fan further comprises: a forward nosecone; and an aft nosecone.

12. The modular air handling system of claim 1, wherein the discharge section further comprises a second humidifier.

13. The modular air handling system of claim 1, wherein the plurality of sensors for receiving process data comprise:
   a plurality of coil temperature differential sensors;
   a plurality of pressure sensors;
   a filter pressure drop sensor;
   an airflow sensor; and
   a motor current sensor.

14. The modular air handling system of claim 1, wherein the plurality of sensors for receiving discharge data comprise:
   a discharge temperature sensor;
   a discharge humidity sensor;

a discharge smoke sensor;
a discharge airflow sensor; and
a discharge pressure sensor.

15. The modular air handling system of claim 1, wherein the plurality of sensors for receiving environmental data comprise:
an ambient air temperature sensor;
an ambient humidity sensor;
a room humidity sensor; and
a corresponding room temperature sensor.

16. A modular air handling system comprising:
at least one blade, wherein each of the at least one blades comprises:
an intake section for receiving an airflow comprising:
an intake air portion, a filter portion, a coil portion, and a head portion;
a removable fan module, wherein the removable fan module comprises:
at least two low velocity axial fans; and an isolation damper;
a discharge section for discharging the airflow comprising:
a discharge air portion; and
a plurality of sensors for receiving process data, discharge data, and environmental data; and
a control system for processing data from the plurality of sensors to provide a closed loop control of the modular air handling system, wherein
each blade operates independently, and wherein
the at least two low velocity axial fans for each removable fan module are controlled by a single control signal.

17. The modular air handling system of claim 16, wherein the at least two fans are positioned in series or in parallel with respect to one another within each removable fan module.

18. A modular air handling system comprising:
at least two blades, wherein each of the at least two blades comprises:
an intake section for receiving an airflow comprising:
an intake air portion, a filter portion, a coil portion, and a head portion;
a removable fan module, wherein the removable fan module comprises:
a plurality of low velocity axial fans; and an isolation damper;
a discharge section for discharging the airflow comprising:
a discharge air portion; and
a plurality of sensors for receiving process data, discharge data, and environmental data; and
a control system for processing data from the plurality of sensors to provide a closed loop control of the modular air handling system, wherein
each blade operates independently, and wherein
the plurality of low velocity axial fans for each removable fan module are controlled by a single control signal.

19. The modular air handling system of claim 18, wherein the at least two fans are positioned in series or in parallel with respect to one another within each removable fan module.

* * * * *